UNITED STATES PATENT OFFICE.

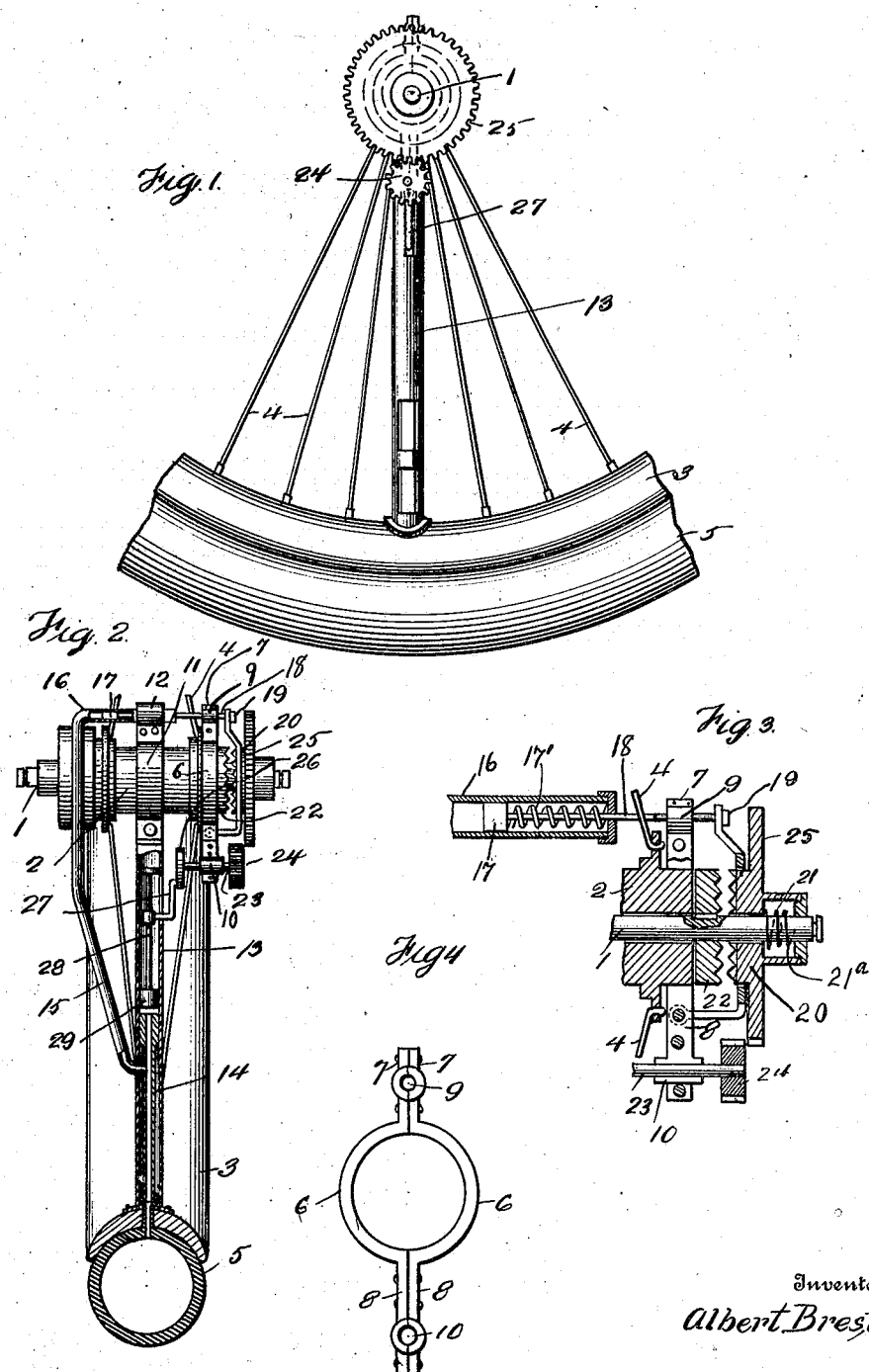

ALBERT BREST, OF NEW CASTLE, PENNSYLVANIA.

PNEUMATIC PUMP.

No. 894,586.  Specification of Letters Patent.  Patented July 28, 1908.

Application filed October 19, 1907. Serial No. 398,186.

*To all whom it may concern:*

Be it known that I, ALBERT BREST, a citizen of the United States of America, residing at New Castle, in the county of Lawrence and State of Pennsylvania, have invented certain new and useful Improvements in Pneumatic Pumps, of which the following is a specification, reference being had therein to the accompanying drawing.

This invention relates to pneumatic pumps for inflating rubber tires, and its object is, to provide means for inflating the tires of an automobile while the machine is in motion.

The invention comprises a clutch mounted upon the wheel axle, a cylinder and piston, and mechanism operated thereby for throwing the clutch members into engagement, and automatic mechanism for disconnecting the clutch members after the tire has been inflated.

The construction of the improvement will be fully described hereinafter, in connection with the accompanying drawing which forms a part of this specification, and its novel features will be defined in the appended claims.

In the drawing: Figure 1 is a side elevation of a portion of an automobile wheel with my improvement applied thereto, Fig. 2 is a view partly in vertical section, and partly in elevation of the same, Fig. 3 is a sectional view of the clutch mechanism employed, and, Fig. 4 is an elevation of the supporting frame or yoke of the clutch mechanism.

The reference numeral 1 designates the axle spindle upon which the wheel hub 2 is mounted; and the numeral 3 designates the wheel rim connected to the hub by spokes 4, and having a pneumatic tire 5 applied thereto.

Secured upon one end of the hub 2 is a yoke or frame consisting of two semi-circular straps 6, provided with projecting arms 7 and 8 formed with circular bearings 9 and 10 and riveted as shown. Upon the central portion of the hub is mounted a yoke or frame 11 formed at its upper end with a bearing 12 and having secured to its lower end one end of a cylinder 13 the opposite end of which is secured to the wheel rim 3.

Within the cylinder 13 is an air tube 14 extending for approximately one half of the length of the cylinder and communicating with a pipe 15, the upper end 16 of which is supported in the bearing 12. A piston 17 is arranged within the upper arm 16 of the pipe 15, provided with a piston rod 18 supported in the bearing 9 and having a head 19 adapted to bear against the clutch member 20, which is loosely supported upon the spindle 1, and is provided with a spring housing 21, containing a coil spring 21$^a$.

A spring 17' is arranged on the rod 18 within the portion 16 of the pipe 15, between said piston 17 and the closed end of the pipe.

The other clutch member 22 is keyed to the spindle 1 and the confronting faces of both clutch members are formed with teeth adapted to interlock when the members are in engagement.

Mounted in the bearing 10 is a shaft 23 upon the outer end of which is secured a pinion 24 adapted to mesh with a gear 25 forming a part of the clutch member 20. Upon the inner end of the shaft 23 is a crank-disk 26 connected to one end of a crank 27 the opposite end of which is connected to a piston rod 28 within the cylinder 13 and carrying a piston 29.

The operation of the mechanism constructed as above described is as follows: As long as the tire 5 is inflated, air passing through the tube 14, and pipes 15 and 16 will force the head 19 of the piston rod 18 against the gear 25 of the clutch member 20 thus holding the two clutch members out of engagement, and also holding the gear 25 out of mesh with the pinion 24. As soon however as the air pressure is reduced the piston rod 18 moves away from the gear 25, the coil spring 21$^a$ forces the clutch member 20 into engagement with the member 22, and at the same time causes the gear 25 to engage the pinion 24. This brings the piston 29 into action through the intermediacy of the crank-disk 26, and crank 27 to pump air into the tire. When the air pressure is sufficiently increased to overcome the tension of the spring 17', the piston 17 will be moved forcing rod 18 outwardly so as to cause the head 19 to engage the gear 25 so as to separate the clutch members and stop the pumping action of the piston 29.

It will be apparent that the operation of the pump is automatic and that the wheel tire is inflated while in motion.

I would have it understood that the invention includes all such variations and modifications in the details of construction as may fall within the terms and scope of the following claims.

Having fully described my invention what I claim as new and desire to secure by Letters Patent is, 1. A pump attachment for pneumatic tires comprising a pump cylinder supported at one end on the wheel rim, a yoke secured to the wheel hub centrally of the latter and to which the other end of said pump cylinder is connected, said yoke provided at its outer end with a bearing, a pipe communicating with said pump cylinder intermediate the ends thereof and having its outer end extended angularly and received in the bearing of said yoke, a frame fixed on the wheel hub adjacent one end thereof and provided near each end with a bearing, a shaft mounted in one of said bearings and carrying a crank, a piston within said pump cylinder to which said crank is connected, a piston arranged in the angularly extended portion of said pipe and having its rod extended through the other bearing of said frame, a clutch member rigidly fixed on the axle of said wheel, a second clutch member movably mounted on said axle and normally held out of engagement with the rigid clutch member of said piston rod, and a pinion on said shaft to engage with the movable clutch member when the latter is in engagement with the rigid clutch member whereby motion is imparted to the piston in said pump cylinder.

2. A pump attachment for pneumatic tires comprising in combination with a wheel hub, a wheel rim, and a tire carried by said rim, a pump cylinder connected at one end to the wheel rim, a yoke on the wheel hub to which the other end of the pump cylinder is connected, said yoke provided with a bearing, a pipe communicating at one end with the pump cylinder and having its other end extending parallel with the wheel hub and received in the bearing of said yoke, a frame mounted on the wheel hub and having a bearing adjacent each end, a piston mounted in the angularly extending portion of said pipe having its piston rod received in one of the bearings of said frame, a spring arranged in the pipe between the piston and the closed end of the pipe, a shaft journaled in the other bearing of said frame, a piston in the pump cylinder, connections between said piston and said shaft, a pinion carried by said shaft, and a fixed clutch member and a movable clutch member normally held out of engagement with the pinion on said shaft by the piston rod extending from the angularly extending portion of said pipe.

In testimony whereof I affix my signature in the presence of two witnesses.

ALBERT BREST.

Witnesses:
THOMAS G. FISHER,
JAMES G. FULKERSON.